US006903848B2

(12) United States Patent
Kirita

(10) Patent No.: US 6,903,848 B2
(45) Date of Patent: Jun. 7, 2005

(54) IMAGE READING APPARATUS, IMAGE RECORDING APPARATUS AND IMAGE FORMING APPARATUS

(75) Inventor: Hiroshi Kirita, Ohtsu (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 656 days.

(21) Appl. No.: 09/837,006

(22) Filed: Apr. 17, 2001

(65) Prior Publication Data
US 2001/0040706 A1 Nov. 15, 2001

(30) Foreign Application Priority Data

May 12, 2000 (JP) ........................................ 2000-139868

(51) Int. Cl.[7] .............................. H04N 1/04; H02P 8/00
(52) U.S. Cl. ........................ 358/474; 358/486; 358/496; 358/497; 358/498; 318/685; 318/696
(58) Field of Search ................................ 358/486, 496, 358/498, 497, 401, 501, 474, 409, 471, 400; 399/211–213, 367, 371, 365, 361, 362; 318/696, 685, 34, 39; 382/312

(56) References Cited

U.S. PATENT DOCUMENTS 5,670,855 A    9/1997  Okunishi ..................... 318/696
5,825,512 A *  10/1998 Okita .......................... 358/496

FOREIGN PATENT DOCUMENTS

| JP | 05-308476  | 11/1993 |
| JP | 5-328056   | 12/1993 |
| JP | 08-051796  | 2/1996  |
| JP | 10-055087  | 2/1998  |
| JP | 11-301866  | 11/1999 |

* cited by examiner

Primary Examiner—Cheukfan Lee
(74) Attorney, Agent, or Firm—Hogan & Hartson, LLP

(57) ABSTRACT

An image scanning device that can be manufactured less costly. When ADF scans an original document (21) loaded in a document hopper (22) of a document feeder unit (12), a stepper motor (M2) is first driven by a motor driver (101) such that it moves a first carriage (50) from a second document scanning start position (P3) to a first document scanning position (P2). The first carriage (50) carries a scanner (14). After that, another stepper motor (M1) is activated by the same motor driver (101) to move the original document (21) over a contact glass (25), and the original document is scanned by the scanner (14). The two stepper motors (M1, 2M2) are selectively driven by the single motor driver (101) so that cost reduction is realized as compared with providing two motor drivers for two stepper motors.

10 Claims, 4 Drawing Sheets

IMAGE READING APPARATUS, IMAGE RECORDING APPARATUS AND IMAGE FORMING APPARATUS

CROSS REFERENCES TO RELATED APPLICATIONS

This application claims priority of Japanese Patent Application No. 2000-139868 filed in JPO on May 12, 2000 under 35 USC 119, the entire disclosure of which is incorporated herein by reference.

BACKGROUND OF THE INVENTION

1. Field of the Invention

The present invention generally relates to an image reading apparatus, image recording apparatus and image forming apparatus, and more particularly to an image forming apparatus such as facsimile machine having a photocopy function, and an image reading apparatus and image printing apparatus incorporated in the image forming apparatus.

2. Description of the Related Art

In recent years, prevailing are copy machines and facsimile machines having a photocopy function (fax-copy machines) that are equipped with a flat bed scanner (FBS) for scanning a stationary image on an original document placed on a platen and an automatic document feeder (ADF) for feeding plural sheets of original paper set in a document hopper sheet by sheet and scanning images on the original paper.

In this type of fax-copy machines, ADF has a paper feed motor for moving sheets loaded into the document hopper, and FBS has a drive motor for moving a carriage from a scanning start position to an end position.

These and other motors used in the fax-copy machine are mostly stepper motors since original document positioning and carriage positioning should be done at high accuracy. Conventionally each of the stepper motors has its own motor driver.

However, the motor driver is generally expensive so that the fax-copy machine that needs a plurality of motor drivers is also costly.

On the other hand, a motor driver that has two circuits adapted to drive two stepper motors is also known. If this motor driver is employed, a necessary cost per one stepper motor is reduced as compared with the motor driver that has only one circuit. However, the two-circuit motor driver is also expensive so that it does not contribute to manufacturing cost reduction very much.

SUMMARY OF THE INVENTION

An object of the present invention is to provide an image reading apparatus, image recording apparatus and image forming apparatus that can reduce manufacturing costs.

According to one aspect of the present invention, there is provided an image reading apparatus comprising a scanning unit for scanning an image, a first motor for feeding an original document such that the scanning unit scans an image of the document, and a second motor for moving the scanning unit from a home position to a document scanning position, characterized in that a single motor driving circuit is provided for selectively driving the first and second motors, and a control unit is provided for selecting one of the first and second motors such that the motor driving circuit drives the selected motor.

The image reading apparatus may further include a relay for sending an output signal of the motor driving circuit to one of the first and second motors, and the control unit may switch the relay to select the first or second motor. Each of the first and second motors may be a stepper motor. The scanning unit may be a carriage of a flat bed scanner.

The control unit may issue a control signal and current value data to the motor driving circuit in accordance with the selected motor such that desired currents are fed to respective windings of the selected motor in a desired sequence. In general, the first and second motors have different motor characteristics so that they should be activated with different currents and sequences respectively. Since the control unit issues suitable control signals and current data to the two motors differently, only one motor driving circuit is needed for the two motors.

The control unit may not cause the motor driving circuit to drive the first and second motors simultaneously. By doing so, problems associated with use of a two-circuit motor driver adapted to drive the first and second motors will be avoided. Specifically, when the two-circuit motor driver activates the two stepper motors, an allowance loss of the motor driver should generally be considered so that a motor drive current is limited and a necessary torque cannot be obtained. Such problem will be prevented by the present invention.

According to a second aspect of the present invention, there is provided an image recording apparatus comprising a recording unit for recording an image on a recording sheet, a plurality of paper cassettes for accommodating predetermined recording sheets, and a plurality of motors associated with the plurality of paper cassettes respectively for feeding the recording sheets to the recording unit from the plurality of paper cassettes, characterized in that a single motor driving unit is provided for driving the plurality of motors, and a control unit is provided for selecting one of the plurality of motors such that the single motor driving unit drives the selected motor.

According to a third aspect of the present invention, there is provided an image forming apparatus that includes at least one of the image reading apparatus of the first aspect and the image recording apparatus of the second aspect.

According to a fourth aspect of the present invention, there is provided an image forming apparatus that includes a first motor for feeding an original document such that an image on the document is scanned, a second motor for moving a carriage from a home position to a document scanning position, a scanner device for scanning the image on the document, a printing unit for printing the scanned image data on a recording sheet, and a third motor for supplying a predetermined recording sheet such that the printing unit prints the image data on it, characterized in that a single motor drive circuit is provided for selectively driving the three motors, and a control unit is provided for selecting one of the three motors and causing the motor drive circuit to drive the selected motor. Further cost reduction can be realized as compared with the single drive circuit which selectively drives two motors.

Additional objects, aspects, benefits and advantages of the present invention will become apparent to those skilled in the art to which the present invention pertains from the subsequent detailed description and the appended claims, taken in conjunction with the accompanying drawings.

DETAILED DESCRIPTION OF THE INVENTION

An embodiment of the present invention will now be described in reference to the accompanying drawings.

Figure 1:
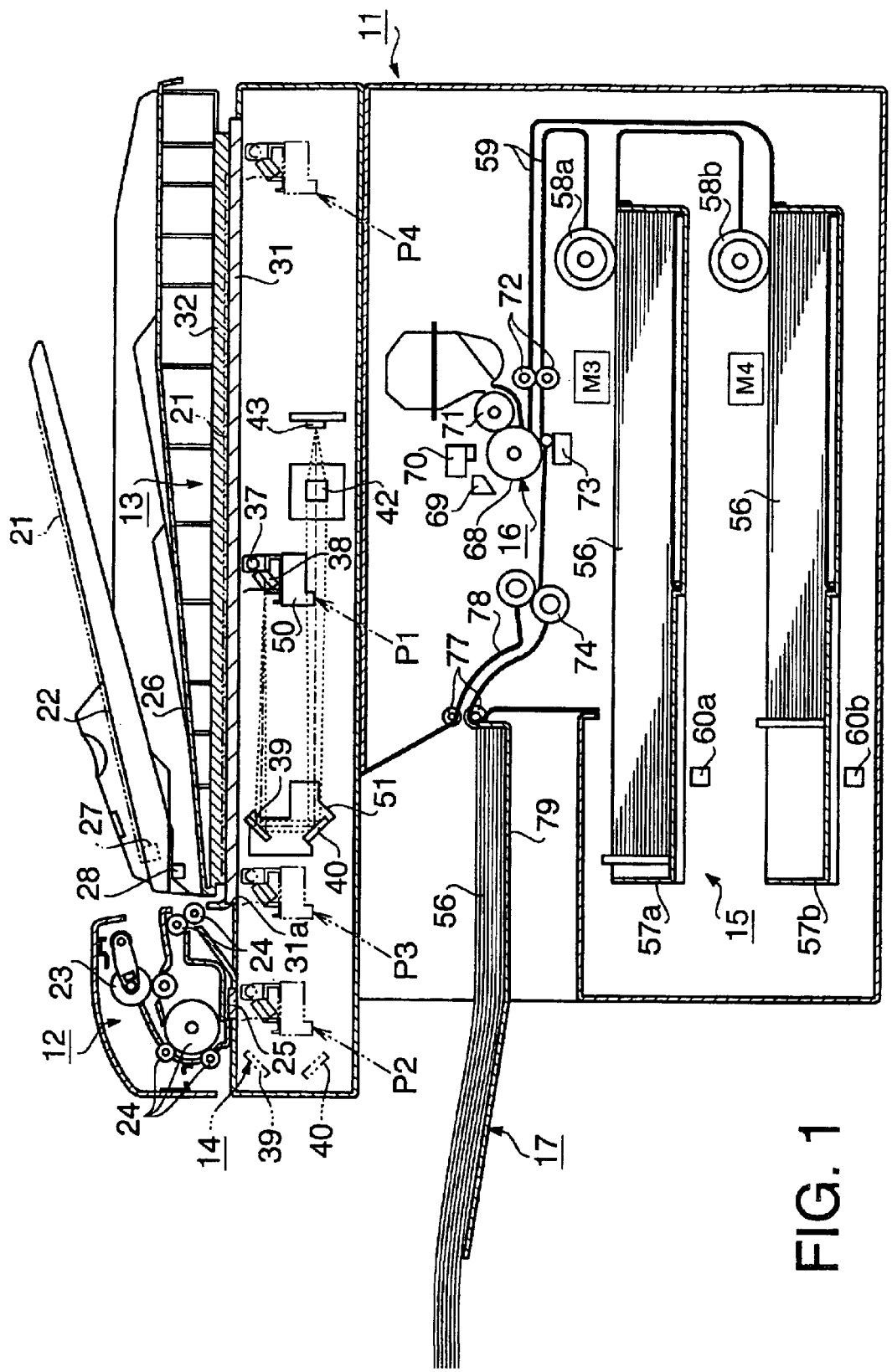
FIG. 1 is a cross sectional view of a facsimile machine having a photocopy function according to the present invention.

Referring to FIG. 1, a facsimile machine having a photocopy function 11 includes a document feeder unit 12, platen 13, scanning unit 14, paper supply unit 15, recording unit 16 and paper discharge unit 17.

The document feeder unit 12 includes a document hopper 22 adapted to hold plural sheets of original paper (first document) 21, a separate roller 23 for separating and feeding the sheets 21 from the document hopper 22 sheet by sheet, a plurality of feed rollers 24 for transporting the sheets 21 along a paper path, a contact glass 25 over which the sheets 21 pass, and a document exit tray 26 for receiving the sheets 21 discharged from the paper path. The document feeder unit 12 also has a stepper motor M1 (FIG. 2) to rotate the separate roller 23 and feed rollers 24 for movements of the sheets 21.

A document sensor 27 is opposed to the document hopper 22 to output a detection signal when the original paper 21 is placed in the document hopper 22. A document discharge sensor 28 is opposed to the document exit tray 26 to output a detection signal when the original document 21 is discharged onto the exit tray 26.

The platen 13 includes a transparent platen glass 31 on which original paper (second document) 21 is placed, and a pivotable lid 32 that can be laid over the platen 31. The lid 32 has an open position (raised position) and a closed position (laid position). The document hopper 22 and exit tray 26 of the document feeder unit 12 are positioned above the lid 32 of the platen 13 and moved between open and closed positions together with the lid 32.

The scanning unit 14 includes a light source 37 to irradiate a light onto the original document 21 passing over the contact glass 25 or placed on the platen 31, first to third mirrors 38 to 40 for changing a path of the light reflected by the original document 21, and a translation mechanism 41 (FIG. 2) for moving the light source 37 and first to third mirrors 38 to 40. Further, the scanning unit 14 includes a convergence lens 42 for converging the light from the third mirror 40, and an image sensor (CCD) 43 for reading the image on the original document 21 based on the light coming through the convergence lens 42 so as to output the scanned image data in the form of analog signal.

Figure 2:
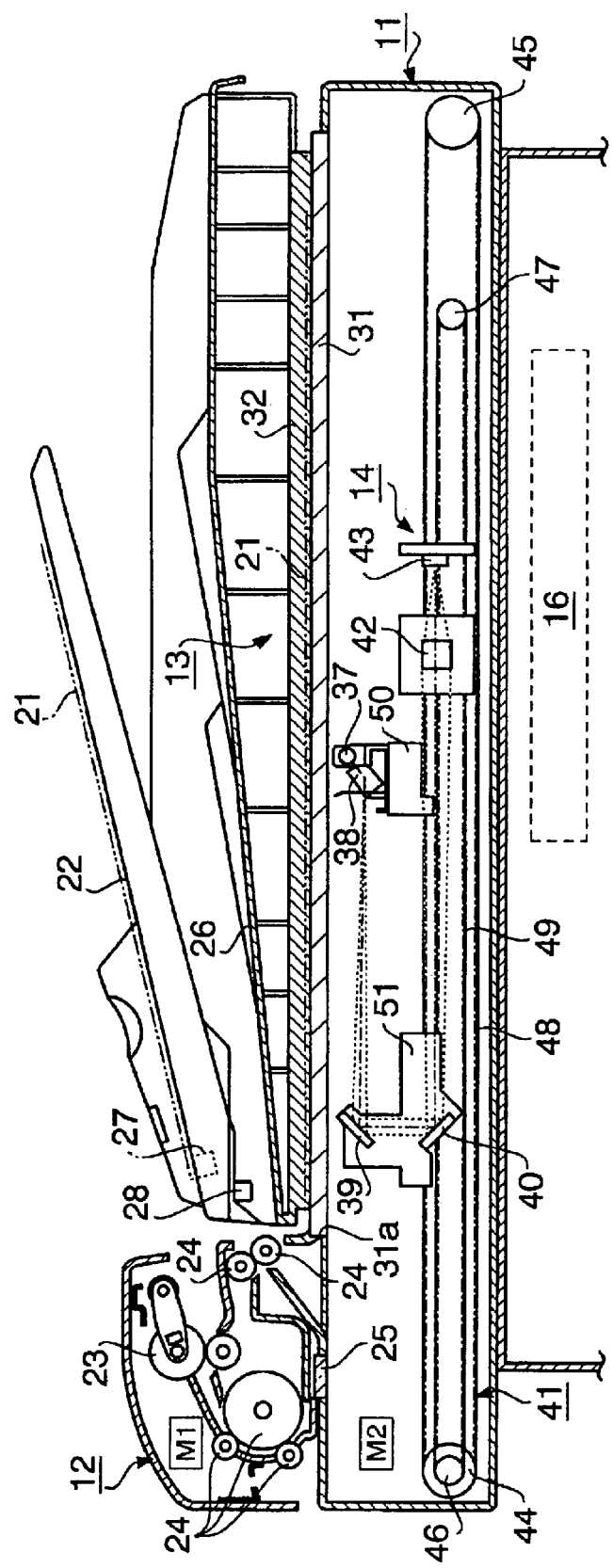
FIG. 2 is an enlarged partial cross sectional view of the facsimile machine shown in FIG. 1.

As illustrated in FIG. 2, the translation mechanism 41 includes a pair of right and left large-diameter pulleys 44 and 45, a pair of right and left small-diameter pulleys 46 and 47, a first belt 48 engaged over the large pulleys 44 and 45, and a second belt 49 engaged over the small pulleys 46 and 47. The translation mechanism 41 also includes a first carriage 50 connected to the first belt 48, a second carriage 51 connected to the second belt 49, and a second stepper motor M2 for moving the first and second carriages.

The diameter of each large pulley 44, 45 is twice that of the small pulley 46, 47. The left large pulley 44 and small pulley 46 are supported coaxially and rotated together. These pulleys are operatively coupled to a shaft of the stepper motor M2. The first carriage 50 supports the light source 37 and first mirror 38, and the second carriage 51 supports the second and third mirrors 39 and 40.

As the large pulleys 44 and 45 and small pulleys 46 and 47 are rotated by the stepper motor M2, the first and second carriages 50 and 51 are caused to move via the first and second belts 48 and 49. The first carriage 50 moves at a speed twice as fast as the second carriage 51. The first and second carriages 50 and 51 are selectively moved to an intermediate, stand-by position P1, a first document scanning position P2 immediately below the contact glass 25, and a second document scanning start position P3 immediately below a reference end 31a of the platen glass 31, as shown in FIG. 1.

The document feeder unit 12 and scanning unit 14 constitute an automatic document feeder (ADF) such that the original document 21 passing over the contact glass 25 is scanned when the first carriage 50 is positioned at the first document scanning position P2.

The platen 13 and scanning unit 14 constitute a flat bed scanner (FBS) such that the first carriage 50 is first moved to the second document scanning start position P3, i.e., home position of FBS, and then to a second document scanning end position P4 to scan the image on the original document 21 placed on the platen glass 31.

The paper supply unit 15 includes two cassettes 57a and 57b for storing recording sheets 56 of predetermined size in a stacked condition. It should be noted that the paper supply unit 15 may include more than two paper cassettes. The paper supply unit 15 has pick-up rollers 58a and 58b for feeding the recording paper 56 to the recording unit 16 from the respective paper cassettes 57a and 57b sheet by sheet, and a guide plate 59 for guiding transportation of the recording paper 56. In the illustrated embodiment, the paper cassettes 57a and 57b accommodate different sizes of paper 56. The paper supply unit 15 also includes a third stepper motor M3 for rotating the pick-up roller 58a and a fourth stepper motor M4 for rotating the other pick-up roller 58b.

Paper size sensors 60a and 60b are associated with the paper cassettes 57a and 57b respectively. When the paper cassettes 57a and 57b are inserted into predetermined positions, the paper size sensors 60a and 60b detects sizes of recording paper 56 in these paper cassettes and output detection signals respectively.

The printing unit 16 includes a photosensitive drum 68 having a photoconductive film on its surface, a charger 69 for uniformly charging the photoconductive film of the photosensitive drum with a predetermined voltage, an exposure unit 70 for forming an electrostatic latent image on the photosensitive drum 68, and a developer 71 for feeding a toner over the latent image on the photosensitive drum 68 to develop the latent image. The printing unit 16 also has a feed roller 72 for transmitting the recording sheets 56 to the photosensitive drum 68, a transfer unit 73 for transferring the toner image to the recording sheet 56 from the photosensitive drum 68, and a fixing unit 74 for heating the toner image on the recording sheet 56 for fixing.

The paper discharge unit 17 has a paper discharge roller 77 for discharging the recording sheet 56 after printing, a guide plate 78 for guiding the discharging of the recording sheet 56, and a paper tray 79 for receiving the discharged recording sheet 56.

The feed rollers 72, photosensitive drum 68, developer 71 and paper discharge roller 77 of the recording unit 16 and paper discharge unit 17 are driven (rotated) by one or more stepper motors (not shown).

Figure 3:
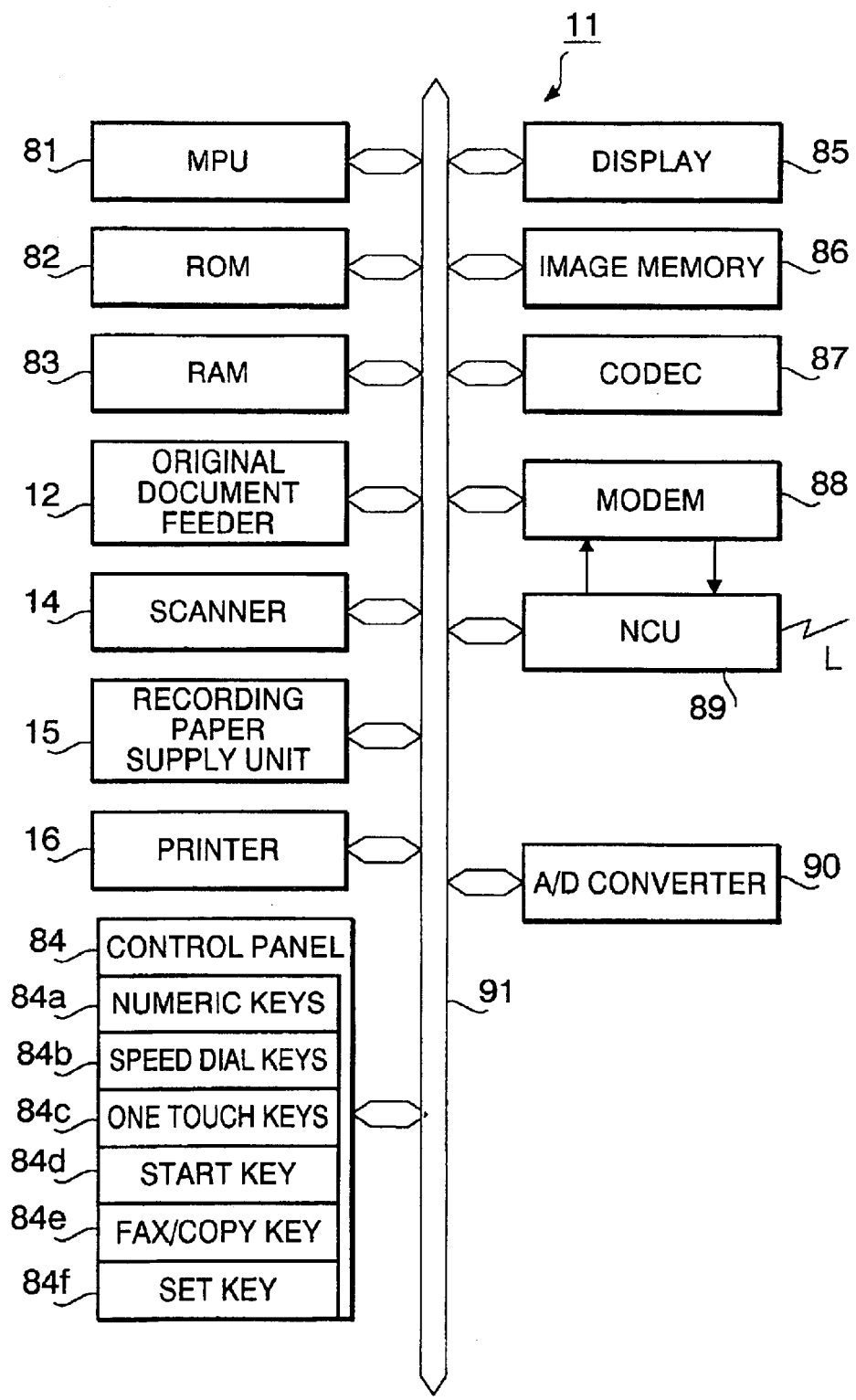
FIG. 3 illustrates a block diagram of the facsimile machine shown in FIG. 1.

Referring now to FIG. 3, an electrical structure of the facsimile machine 11 will be described.

The facsimile machine 11 includes MPU (micro processor unit) 81, ROM (read only memory) 82, RAM (random access memory) 83, document feeder unit 12, scanning unit 14, paper supply unit 15, recording unit 16, control panel 84, display unit 85, image memory 86, codec (coder and decoder) 87, modem 88, NCU (network control unit) 89 and A/D converter (analog-digital converter) 90. These hardware elements are connected to each other over a bus 91.

MPU 81 controls the hardware elements of the facsimile machine 11. ROM 82 stores operation programs for the facsimile machine 11. RAM 83 temporarily stores various data used during execution of the programs.

The document feeder unit 12 feeds the original paper 21 loaded on the document hopper 22. The scanning unit 14 scans an image on the original paper 21 via the contact glass 25 or platen glass 31, and outputs image data of the scanned image. The recording sheet supply unit 15 supplies recording sheets 56 of proper size to the recording unit 16 from one of the paper cassettes 57a and 57b that is selected depending upon the size of the original paper or the like. The recording unit 16 is an electrophotographic printer and prints image data, which is received from a remote machine during facsimile communication or obtained from the scanner 14 during a copying operation, on a recording sheet 56.

The operation panel 83 includes numeric keys (including 0 to 9, * and #) 84a for inputting telephone and facsimile numbers and the like, speed dial keys 84b for registering speed dial numbers and making a call using a speed dial number, a one-touch key 84c for dialing a pre-registered facsimile number by a one-touch operation, a start key 84d for starting a document scanning operation, a fax/copy key 84e to select a facsimile mode or a copy mode, a cassette selection key 84f for specifying a desired paper cassette, and other keys and buttons. The display unit 85 includes LCD (liquid crystal display) and indicates various information of the facsimile machine 11 such as operating conditions.

The image memory 86 temporarily stores image data, which is received from a remote machine or read in by the scanner 14. The codec 87 encodes the image data scanned by the scanner 14 with MH, MR, MMR, JBIG or the like for data transmission to a remote machine. The codec 87 also decodes the image data received.

The modem 88 modulates and demodulates the image data to be sent and received according to V.17, V27ter, V29 or the like defined in ITU (international telecommunication union) –T Recommendations T.30 facsimile data transmission procedures. NCU 89 connects and releases the telephone line L, transmits a dial signal corresponding to a facsimile number of a remote machine and detects a call from a remote machine. The A/D converter 90 converts analog data, which is an output signal of the image sensor 43, to digital data.

Figure 4:
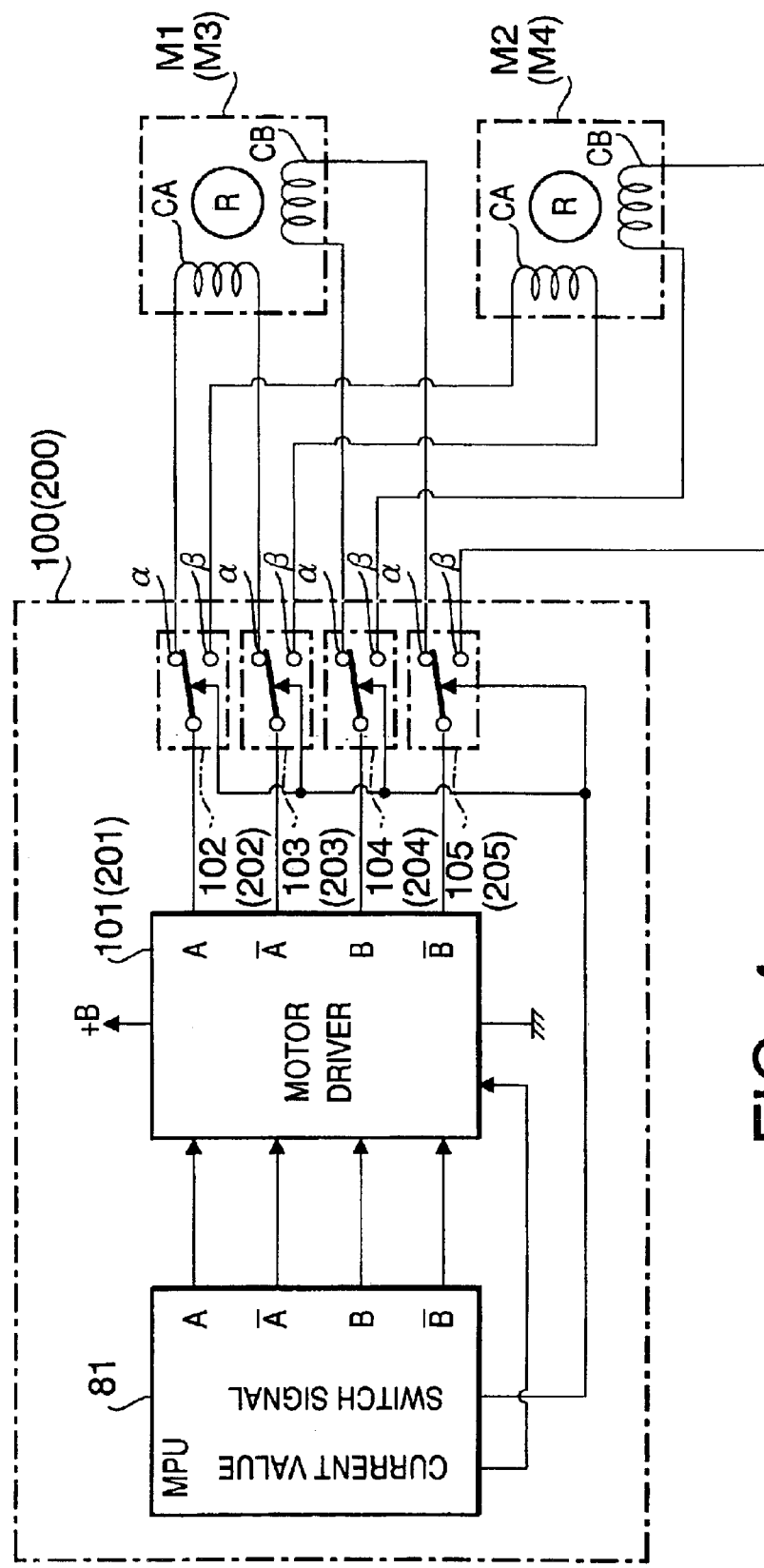
FIG. 4 is a schematic diagram of a motor drive circuit employed in the facsimile machine shown in FIG. 1.

Referring to FIG. 4, a motor drive circuit 100 for driving the stepper motors M1 and M2 used in ADF will be described. It should be noted that a drive circuit 200 for driving the stepper motors M3 and M4 employed in the paper supply unit 15 is similar to the drive circuit 100 so that its description will be omitted here.

As illustrated in FIG. 4, the motor drive circuit 100 is associated with the stepper motors M1 and M2, and includes MPU 81, motor driver 101 and relays 102 to 105. In this embodiment, each of the stepper motors M1 to M4 is a hybrid bi-phase stepper motor, and has a winding CA of A phase, a winding CB of B phase and a rotor R.

MPU 81 outputs control signals to the motor driver 101 to feed currents to the windings CA and CB of each motor in respective predetermined sequences. MPU 81 also outputs current value data to the motor driver 101 such that the currents to the windings CA and CB have desired values respectively. Moreover, MPU 81 outputs switch signals to the relays 102 to 105 to select one of the stepper motors M1 and M2. The motor driver 101 controls the stepper motors M1 and M2.

Each of the relays 102 to 105 has a relay coil (not shown). When a switch signal is input to the relays 102 to 105 from MPU 81 to drive the first stepper motor M1, respective movable contacts are connected to contacts a for the stepper motor M1 as shown in FIG. 4. On the other hand, when a switch signal is input to the relays 102 to 105 to drive the other stepper motor M2, the relays are synchronously excited. Then, the respective moving contacts are synchronously switched to contacts β for the stepper motor M2 from the contacts α.

The motor driver 101 is connected to a motor power source (+B and grounding). The motor driver 101 obtains electricity from the motor power source, and feeds appropriate currents to the windings CA and CB of the selected stepper motor, depending upon the positions of the relays, in predetermined sequences based on the control signals and current value data from MPU 81.

Next, an operation of the facsimile machine 11 when a plurality of original document sheets 21 are scanned by ADF will be described.

As plural pages of original paper 21 are set in the document hopper 22, the document sensor 27 sends a detection signal to MPU 81. If the start key 84d is pressed subsequently, MPU 81 outputs a switching signal to the relays 102 to 105. The relays 102 to 105 are synchronously excited and their contacts are moved from the contacts α to β. In the meantime, MPU 81 outputs a control signal and current value data to the motor driver 101 to feed currents to the windings CA and CB of the stepper motor M2 in a predetermined sequence. Accordingly, the stepper motor M2 is driven by the motor driver 101 based on the control signal and current data from MPU.

As the stepper motor M2 is activated, the first carriage 50 is caused to move from the second document scanning start position P3 to the first document scanning position P2.

When the first carriage 50 reaches the first document scanning position P2, MPU 81 issues a switching signal to the relays 102 to 105. As a result, the relay coils of the relays 102 to 105 are synchronously excited and the movable contacts of the relays are synchronously switched to the contacts α from β. Subsequently, MPU 81 issues a control signal and current value data to the motor driver 101 to supply desired currents to the windings CA and CB of the stepper motor M1 in a predetermined sequence. As a result, the stepper motor M1 is activated by the motor driver 101 based on the given control signal and current data.

Upon activation of the stepper motor M1, the separate roller 23 and feed rollers 24 are caused to rotate so that the original sheets 21 are carried along a paper path from the document hopper 22 sheet by sheet. The original document 21 passing over the contact glass 25 is scanned by the scanner 14, with the first carriage 50 being position at the first document scanning position P2. The scanned image is stored into the image memory 86.

When the image scanning of the original document 21 is complete, MPU 81 issues a switching signal to the relays 102 to 105 to drive the stepper motor M2. In the meantime, MPU 81 issues a control signal and current value data to the motor driver 101 to feed desired currents to the windings CA and CB of the stepper motor M2 in a desired sequence. As a result, the motor driver 101 activates the stepper motor M2, as described earlier.

After the second stepper motor M2 is activated, the first carriage 50 moves to the second document scanning start position P3 from the first document scanning position P2. Specifically, the first carriage 50 returns to the home position of FBS.

Next, an operation of the facsimile machine 11 when the printer 16 prints image data on a recording sheet 56 will be described.

If an image present on the original paper 21 is scanned by ADF or FBS, or an image is received from a remote machine, its image data is stored in the image memory 86. This image data will be read out from the image memory 86 and printed on a recording sheet 56. The following description deals with a case where the set key 84f selects the paper cassette 57b for printing.

Before the image data is retrieved from the image memory 86, MPU 81 issues a switching signal to the relays 202 to 205 to drive the stepper motor M4. Then, relay coils of the relays 202 to 205 are synchronously excited and movable contacts of the relays are switched to contacts β for the stepper motor M4. At the same time, MPU 81 issues a control signal and current value data to the motor driver 201 to feed desired currents to the windings CA and CB of the stepper motors M4 in a desired sequence. Accordingly, the stepper motor M4 is actuated by the motor driver 201 based on the given control signal and current.

As the stepper motor M4 is activated, the paper feed roller 58b rotates and feeds the recording sheets 56 sheet by sheet from the paper cassette 57b. Another motor driver (not shown) also drives an associated stepper motor (not shown) to rotate the feed rollers 72, photosensitive drum 68, developer 71 and paper discharge roller 77. Consequently, image data read out of the image memory 86 is printed on the recording sheet 56, and the recorded sheet 56 is accumulated in the paper discharge tray 79.

It should now be assumed that after the image data is printed on the recording sheet 56 supplied from the paper cassettes 57b, the user presses the set key 84f to select the other paper cassette 57a for printing.

First, MPU 81 sends a switching signal to the relays 202 to 205 to drive the stepper motor M3. Relay coils of the relays 202 to 205 are synchronously degaussed and the movable contacts of the relays 202 to 205 are synchronously switched to the contacts a for the stepper motor M3. At the same time, MPU 81 sends a control signal and current value data to the motor driver 201 such that desired currents are fed to the windings CA and CB of the third stepper motor M3 in a desired sequence. Therefore, the stepper motor M3 is activated by the motor driver 201 based on the given control signal and current.

As the stepper motor M3 is activated, the paper feed roller 58a is caused to rotate and feed the recording sheets 56 sheet by sheet from the paper cassette 57a. Another motor driver (not shown) also drives an associated stepper motor (not shown) to rotate the feed rollers 72, photosensitive drum 68, developer 71 and paper discharge roller 77. Consequently, image data read out of the image memory 86 is printed on the recording sheet 56, and the recorded sheet 56 is accumulated in the paper discharge tray 79.

As understood from the foregoing, the present embodiment has the following advantages.

(1) When the original document 21 in the document hopper 22 is scanned by ADF, presence of the original document (first document) 21 is notified to MPU 81 from the document sensor 27. MPU 81 then controls the motor driver 101 to drive the second stepper motor M2 such that the first carriage 50 at the second document scanning start position (home position) P3 is moved to the first document scanning position P2.

When the movement of the first carriage 50 is complete, MPU 81 controls the motor driver 101 to drive the first stepper motor M1 such that the original document 21 is carried over the contact glass 25. In this manner, the original document 21 passing over the contact glass 25 is scanned by the scanner 14, with the first carriage 50 being positioned at the scanning position P2. Specifically, MPU 81 selects one of the stepper motors M1 and M2 and causes the single motor driver 101 to drive the selected stepper motor.

Motor characteristics of the stepper motors M1 and M2 are different. Therefore, it is necessary to feed different currents to the respective windings CA and CB of the stepper motors in different sequences. In this embodiment, MPU 81 issues different control signals and current value data to the motor driver 101 for the respective stepper motors M1 and M2.

Accordingly, even if the stepper motors M1 and M2 of different characteristics should be driven, a single motor driver 101 is only needed. Therefore, cost reduction can be realized as compared with a case where the two stepper motors have their own motor drivers respectively.

(2) When the user operates the set key 84f to use the paper cassette 57b for printing, MPU 81 controls the driver motor 201 to drive the stepper motor M4. If the user selects the paper cassette 57a, on the other hand, MPU 81 controls the driver motor 201 to drive the stepper motor M3. In other words, MPU 81 selects one of the stepper motors M3 and M4 and causes the single motor driver 201 to activate the selected stepper motor.

Motor characteristics of the stepper motor M3 are different from the stepper motor M4. Therefore, it is necessary to feed different currents to the respective windings CA and CB of the stepper motors M3 and M4 in different sequences. In the illustrated embodiment, MPU 81 issues different control signals and current value data to the motor driver 201 for the respective stepper motors M3 and M4.

Thus, even if the stepper motors M3 and M4 of different characteristics should be driven, a single motor driver 201 is only needed. Therefore, cost reduction can be realized as compared with a case where the two stepper motors have their own motor drivers respectively.

The present invention is not limited to the described and illustrated embodiment. Various changes and modifications can be made without departing from the spirit and scope of the present invention. Some examples of such modification will be described below.

1) The two paper cassettes 57a and 57b may hold recording sheets of same size.

2) The facsimile machine 11 may have more than two paper cassettes. In this case, an additional set of paper feed roller, paper size sensor, stepper motor and other parts should be provided for each of the additional paper cassettes. Further, a switch that can switch the stepper motors should be provided in place of the relays 102 to 105. For example, if three paper cassettes are provided and three stepper motors (M1, M2 and another one, or M3, M4 and another one) are associated therewith, this switch should be able to select one of the three stepper motors (three-way switch).

Under the control of MPU 81, one of the three stepper motors is selected and driven by the single motor driver 101 or 201. In this manner, further cost reduction is realized if more paper cassettes and stepper motors are provided.

3) It is acceptable to drive the three stepper motors M1, M2 and M3 or M1, M2 and M4 with the single motor driver 101. In this instance, a three-way switch should be provided instead of the relays 102 to 105. MPU 81 selects one of these stepper motors and causes the motor driver 101 to drive it. Since the single motor driver 101 manages the three stepper motors, further cost reduction is realized.

4) It is also satisfactory to drive the stepper motors M1 and M2 with the single motor driver 101 but employ two exclusive-use motor drivers for the stepper motors M3 and M4 respectively, or vice versa.

5) Analog switches, transistors, MOSFETs and the like may be employed instead of the relays 102 to 105 (or 202 to 205). These parts are smaller than the relays so that the size of the facsimile machine 11 can be reduced.

6) The present invention is applied to the image reading apparatus and image recording apparatus of the facsimile machine having a photocopy function in the illustrated embodiment. However, the present invention is also applicable to an image reading apparatus and image recording apparatus of an independent photocopier. Further, the image scanning apparatus of the invention may be embodied in an independent scanner apparatus.

7) Although the stepper motor M2 is activated prior to the stepper motor M1 when ADF scans the original document 21 in the illustrated embodiment, the stepper motor M1 may be activated first.

What is claimed is:

1. An image reading apparatus comprising:

a document sensor for generating a detection signal when a document is present;

a scanning member for scanning an image of the document;

a first motor for feeding the document such that the scanning member scans the image of the document;

a second motor for moving the scanning member from a home position to a document scanning position;

a motor driving unit for selectively driving the first and second motors; and a control unit for receiving the detection signal and selecting, based on the detection signal, one of the first and second motors such that the motor driving unit drives the selected motor.

2. The image reading apparatus according to claim 1 further including a relay for sending an output signal of the motor driving unit to one of the first and second motors, and wherein the control unit switches the relay to select the one of first and second motors.

3. The image reading apparatus according to claim 2, wherein the control unit outputs a control signal and current value data to the motor driving unit in accordance with the selected motor.

4. The image reading apparatus according to claim 3, wherein each of the first and second motors is a stepper motor.

5. The image reading apparatus according to claim 1, wherein the scanning member is a carriage of a flat bed scanner.

6. An image forming apparatus comprising:

an image scanning device including a document sensor for generating a detection signal when a document is present, a scanning member for scanning an image of the document, a first motor for feeding the document such that the scanning member scans the image of the document, a second motor for moving the scanning member from a home position to a document scanning position, a motor driving unit for selectively driving the first and second motors, and a control unit for receiving the detection signal and selecting, based on the detection signal, one of the first and second motors such that the motor driving unit drives the selected motor; and an image recording device.

7. The image forming apparatus according to claim 6 further including a first relay for sending an output signal of the motor driving unit to one of the first and second motors, and wherein the control unit switches the first relay to select the one of the first and second motors.

8. The image forming apparatus according to claim 7, wherein the control unit outputs a control signal and current value data to the motor driving unit in accordance with the selected motor.

9. The image forming apparatus according to claim 8, wherein each of the first and second motors is a stepper motor.

10. The image forming apparatus according to claim 6, wherein the scanning member is a carriage of a flat bed scanner.

* * * * *